April 24, 1956   A. R. NELSON   2,742,790
SEALED GEAR CASING AND DRIVING MEANS
Filed Oct. 31, 1952
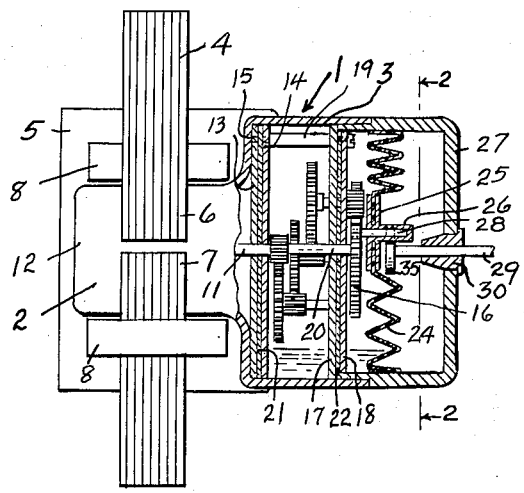
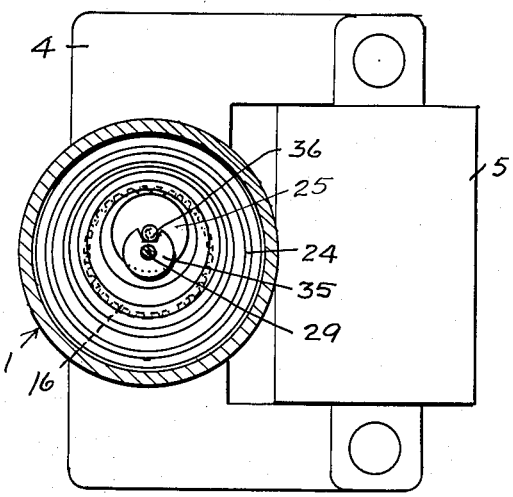
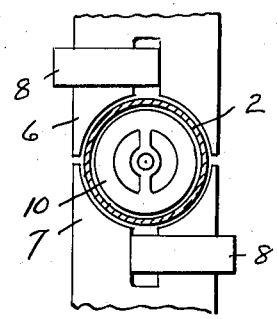
INVENTOR.
ANTON R. NELSON
BY
Boyken, Mohler & Beckley
ATTORNEYS.

United States Patent Office 2,742,790
Patented Apr. 24, 1956

2,742,790

SEALED GEAR CASING AND DRIVING MEANS

Anton R. Nelson, San Mateo, Calif.

Application October 31, 1952, Serial No. 317,943

3 Claims. (Cl. 74—17.8)

This invention relates to electric clocks generally, and more specifically to a lubrication and driving arrangement in an electric clock in which the gear casing containing the lubricating oil and gears is sealed and means is provided for transmitting power from within the casing to the outside of such casing.

One of the objects of the invention is the provision of a sealed gear casing and means for transmitting power from within said casing to the outside without leakage of oil irrespective of the position of the casing or the degree to which it is filled with oil.

Another object of the invention is the provision of improved means within a sealed gear casing containing oil for lubricating the moving parts within such casing.

A still further object of the invention is the provision of a tightly closed gear casing containing a motor and gears and a supply of lubricating oil, and which gear casing includes means for rotating a shaft outside the casing from said motor and gears.

In electric clocks, such for example, as shown in U. S. Letters Patent 2,003,163 of May 28, 1935, to Henry E. Warren, the problem of preventing leakage of oil from within the gear casing was recognized, but attempts to solve the problem have introduced new and objectionable requirements, such as the necessity for maintaining the casing in a predetermined position in order to insure proper lubrication and materially increased weight, and the necessity for revolving the casing, and undesirable response of the hands to variations in current and in setting the clock by hand and other objections.

By the present invention, there is no substantial addition to the weight of the gear casing, and the gears, motor and oil are completely sealed within the casing, which is stationary, while means is provided for driving a shaft outside the casing, which shaft transmits power to the hands for revolving them. No reliance is placed upon magnets or other similar impositive driving connection between the motor and said shaft, but there is a positive mechanical connection that insures a positive transmission of power, and the hands will be driven smoothly and uniformly irrespective of the position of the casing.

Other objects and advantages will appear in the drawings and in the description.

In the drawings, Fig. 1 is a vertical sectional view taken through the gear casing, with the motor containing portion of the casing in elevation, and with the gears within said casing also in elevation.

Fig. 2 is a sectional view taken along line 2—2 of Fig. 1, and Fig. 3 shows the rotor, with the casing in section.

In connection with the illustration, it may be said that the invention is not concerned with the gears that are shown nor with the motor, all of which are conventional and may be as shown in said U. S. Patent 2,003,163 or in any other conventional gear train in which a motor provides a high speed shaft at one end of the train for transmittal of power from the motor to a low speed shaft for driving the hands.

In detail, the casing generally designated 1 includes a motor containing portion 2 and gear containing portion 3, the said portions being preferably coaxial, with the portion 3 larger than portion 2.

The particular illustrated motor may consist of a bipolar stator 4 energized by a single phase coil 5 with pole pieces 6, 7 provided with shading coils 8 on the trailing pole tip to create a rotating magnetic field in the circular space between the pole pieces.

In Fig. 3 the motor rotor is indicated at 10, and this rotor is contained within the reduced size portion 2 of the casing concentric with the gear containing portion 3.

Rotor 10 is secured on a shaft 11 that may be rotatably supported at one end in a bearing on head 12 of the motor containing portion, if desired, and said shaft rotatably extends through a pair of parallel plates 13, 14 that are within the portion 3 of the casing 2, and against the shoulder 15 at the juncture between the portions 2, 3 of said casing. Said shaft 11 is rotatably supported in said plates and is the high speed shaft that provides the power for driving the gears within the portion 3.

Inasmuch as the gear themselves, as shown, and their arrangement are conventional, there is no need for describing them in more detail than to point out that the high speed rotor shaft 11 drives the gear train that ends in a low speed gear 16 that is concentric with the casing 1, the said portions 2, 3 of the latter being cylindrical and concentric, although the gear 16 need not necessarily be concentric with the casing.

Adjacent to gear 16 at the side thereof nearest the plates 13, 14 is preferably another set of plates 17, 18 that are similar to plates 13, 14 and that are secured to the plates 13, 14 in spaced relation to the latter set, by any suitable spacing bolts 19. These plates also function to support shaft 20 that carries the gear 16 and other conventional shafts as may be required.

Between plates 13, 14 and between plates 17, 18 are discs 21, 22 of oil absorbent material such, for example, as blotter-like material that is adapted to carry the oil in portion 3, by capillary action to the shafts and bearings that may be supported by said plates. Thus the bearings will be adequately lubricated at all times.

Outwardly of the plate 18 (which is most remote from the motor containing end 2 of the casing 1) is a flexible concentrically corrugated diaphragm 24 of this flexible, oil proof plastic material that is impervious to detrimental action from the oil, and this diaphragm is sealed at its edges to the cylindrical walls of the said portion 3 of casing 1.

Centrally of the diaphragm is a disc 25 that is tightly secured to the inner edges of the diaphragm, and this disc 25 is of relatively rigid material formed with a central boss 26 that projects toward the end wall 27 of the main casing 1 that is opposite the head 12 of said casing.

This boss is closed at the end nearest wall 27 and opens toward gear 16 to provide a relatively long bearing for a drive pin 28 eccentrically secured to the said gear 16.

From the foregoing, it will be seen that upon rotation of the gear 16, the boss 26 will revolve about the axis of said gear, being carried around by the pin 28. However, no oil can pass the diaphragm, therefore this diaphragm virtually constitutes the end wall of the gear casing and as will be seen, the head 27 that is adjacent to the diaphragm merely provides a bearing support for a shaft to be driven by the boss 26.

Shaft 29 rotatably extends through the head 27, being supported by any suitable bearing 30 in said head, and the end of the shaft nearest the diaphragm extends alongside the boss 26 to a point adjacent to the disc 25. A disc 35 is carried on said end of shaft 29 and said disc is notched out on one side as at 36 (Fig. 2) to provide a clevis or fork between the sides of which the boss 26 extends.

Upon said revolving of the boss 26, the disc 35 and shaft 29 will be rotated. The drive connection between the gear 16 that is within the tightly sealed casing, and the shaft 29 is positive. They are locked together for rotation as a unit, yet no oil can possibly leak past the diaphragm 24, which diaphragm will be referred to as the end of the gear casing, since it is obvious that the head 27 need not be secured to the casing, although it is preferably so secured.

From the foregoing it will be seen that the boss 26, pin 28, and disc 35 virtually form what may be called a crank type coupling.

Also, it should be observed that the oil absorbent material between plates 14, 15 and 17, 18 functions as a filter for the oil, so as to deliver oil free from foreign material to the bearings.

I claim:

1. In an electric clock; a gear casing having side walls and a pair of spaced end walls in oil tight relationship, a train of gears within said casing, one end wall of said pair being rigid and the other end wall being an imperforate flexible diaphragm formed with annular, concentric corrugations for supporting the central portion of the diaphragm for revolvable movement about the central axis of said diaphragm, a first rigid bearing carried by said casing, a drive shaft rotatable in said first bearing, one gear of said train carried on said drive shaft between said first bearing and said other end wall, a second bearing rigidly carried by said casing, a driven shaft rotatable in said second bearing, means connecting said central portion of said diaphragm with said one gear and with said driven shaft for rotation of said central portion and driven shaft upon rotation of said drive shaft, and a supply of oil within said casing.

2. In an electric clock; a gear casing having side walls and a pair of spaced end walls in oil tight relationship, a train of gears within said casing, one end wall of said pair being rigid and the other end wall being an imperforate flexible diaphragm formed with annular, concentric corrugations for supporting the central portion of the diaphragm for revolvable movement about the central axis of said diaphragm, a first rigid bearing carried by said casing, a drive shaft rotatable in said first bearing, one gear of said train carried on said drive shaft between said first bearing and said other end wall, a second bearing rigidly carried by said casing, a driven shaft rotatable in said second bearing, means connecting said central portion of said diaphragm with said one gear and with said driven shaft for rotation of said central portion and driven shaft upon rotation of said drive shaft, and a supply of oil within said casing, an auxiliary end wall in spaced opposed relation to said one end wall carrying said second bearing and extensions on said side walls supporting said auxiliary end wall so spaced from said one end wall.

3. In an electric clock; a gear casing having side walls and a pair of spaced end walls in oil tight relationship, a train of gears within said casing, one end wall of said pair being rigid and the other end wall being an imperforate flexible diaphragm formed with annular, concentric corrugations for supporting the central portion of the diaphragm for revolvable movement about the central axis of said diaphragm, a first rigid bearing carried by said casing, a drive shaft rotatable in said first bearing, one gear of said train carried on said drive shaft between said first bearing and said other end wall, a second bearing rigidly carried by said casing, a driven shaft rotatable in said second bearing, means connecting said central portion of said diaphragm with said one gear and with said driven shaft for rotation of said central portion and driven shaft upon rotation of said drive shaft, and a supply of oil within said casing, said corrugations of said diaphragm being disposed substantially in a common plane that is perpendicular to said axis.

References Cited in the file of this patent
UNITED STATES PATENTS

| | | |
|---|---|---|
| 1,495,936 | Warren | May 27, 1924 |
| 1,563,380 | Kunkle | Dec. 1, 1925 |
| 2,395,843 | Brown | Mar. 5, 1946 |
| 2,497,867 | Cymmer | Feb. 21, 1950 |